3,240,760
THERMALLY RESISTANT WHOLLY AROMATIC
POLYAMIDES
Jack Preston, Raleigh, and Frank Dobinson, Chapel Hill,
N.C., assignors to Monsanto Company, a corporation
of Delaware
No Drawing. Filed Sept. 11, 1962, Ser. No. 222,930
9 Claims. (Cl. 260—78)

This invention relates to new thermally resistant polyamides. More particularly, the invention relates to high molecular weight wholly aromatic single, multiple and fused ring system polyamides and to a process for their preparation.

Polyamides composed entirely of aromatic rings united by carbonamide grounds

for each of the repeating structural units, are desirable because of their wide range of chemical and physical properties. Such wholly aromatic polyamides have excellent thermal stability and good resistance to other degradative conditions such as acids. In U.S. Patent 3,006,899 to Hill et al., a wholly aromatic polyamide is prepared by reacting an aromatic diamine with an aromatic diacid chloride in an aqueous system. However, certain disadvantages are inherent in the use of the starting materials. Most of the diamines employed easily oxidize to colored products which also limit molecular weight. One problem is due to the corrosive nature of isophthaloyl chloride and the large quantities of hydrogen chloride lost from this diacid chloride during polymerization which must be neutralized. The weight loss upon converting monomer to polymer may run as high as 25 percent. This weight loss, also present in the preparation of poly-m-benzamide in copending application S.N. 146,001 to Huffman et al., may run as high as 38 percent.

It is an object of the present invention to provide new thermally resistant compositions of matter comprising wholly aromatic single, multiple and fused ring containing polyamides. Another object of the invention is to provide new and novel high molecular weight, wholly aromatic film, filament and fiber-forming polyamides which are prepared from the reaction of specific aromatic diamines with halides. Still another object of the invention is to provide aromatic polyamides with predetermined fixed or ordered recurring multi-ring structural units. An additional object is to provide a process for the preparation of these wholly aromatic polyamides. Other objects and advantages will become apparent from the description which follows.

In a general manner, the objects of the invention are accomplished by polymerizing an aromatic diamine monomer having internal carbonamide linkages with an aromatic diacid halide monomer. The diamine is symmetrical and consists of three aromatic nuclei, the central nucleus being joined to the two outer amino nuclei by carbonamide groups. The term "symmetrical" as used herein refers to diamines wherein the outer two aromatic nuclei have the same orientation and the central aromatic nucleus may have any configuration which exhibits at least one plane of symmetry. This enables the resulting polymeric composition to contain, for example, aromatic diacid, aromatic diamine and aminoaroyl units in the recurring structural unit. Since the diamines are symmetrical, polymers prepared from the diamines will have an ordered or fixed relationship with all of the aromatic nuclei united by carbonamide linkages.

The polymers of the invention may be represented by the general formula:

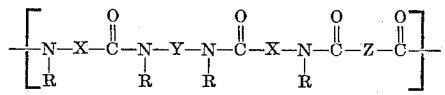

wherein X, Y and Z are divalent aromatic radicals selected from single, multiple and fused ring radicals, at least one of which must have a multi-ring composition, and wherein R may be hydrogen, an alkyl radical containing from 1 to 3 carbon atoms or phenyl. By multi-ring is meant a ring system containing more than one benzene ring such as naphthalene, biphenyl or substituted naphthalene or biphenyl. The positioning of these units can be predetermined by simply changing the diamine portion, the diacid portion, or both portions. Among the many possible multi-ring system polyamides which come within the scope of the above general formula there may be mentioned poly N,N'-m-phenylenebis(m-benzamido) 4,4'-biphenyldicarbonamide, having the structural formula

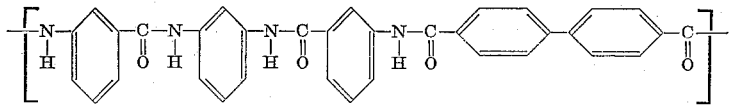

poly N,N'-m-phenylenebis(p-benzamido)4,4'-biphenyldicarbonamide, poly N,N'-m-phenylenebis(m-benzamido) 2,6-naphthalene-dicarbonamide, poly N,N'-m-phenylenebis(p-benzamido)2,6-naphthalene-dicarbonamide, poly N,N'-(2,7-naphthalene)bis(m - benzamido)2,6 - naphthalene-dicarbonamide having the structural formula

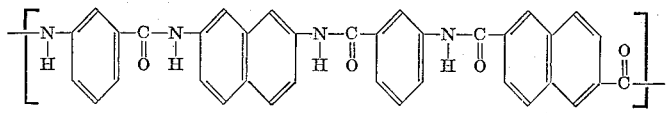

poly N,N'-p-phenylenebis(p-benzamindo)2,6-napthalene-dicarbonamide, poly N,N'-(1,5-naphthalene)bis(m-benzamido)4,4'-biphenyldicarbonamide, poly N,N'-(4,4'-biphenylene)bis(m-benzamido)isophthalamide, poly N,N'-(4,4'-biphenylene)bis(p-benzamido)isophthalamide, poly N,N' - (4,4' - biphenylene)bis(m - benzamido)4,4' - biphenyldicarbonamide and the like.

The polymerization of the polymers of this invention may be by the interfacial or solution techniques. The solution method of polymerization is preferred since the polymer can be spun directly to fibers from the polymerization solution without filtering, washing or drying of the polymer prior to the preparation of the spinning solution. The solution polymerization method may be generally described as follows. The diamine is dissolved in a suitable solvent which is inert to the polymerzation reaction. The same solvents may be employed for both the diamine and the diacid. Among such solvents there may be mentioned dimethylacetamide, 1-methyl-2-pyrrolidone, 1,5-dimethyl - 2 - pyrrolidone, hexamethylphosphoramide and the like. These solvents are rendered more effective in many instances by mixing them with a small amount, up to 10 percent, of an alkali or alkaline earth salt, such as lithium chloride, lithium bromide, magnesium chloride, magnesium bromide, beryllium chloride or calcium chloride. The preferred solvents for solution polymerization are dimethylacetamide or dimethylacetamide containing 5 percent lithium chloride. The diamine solution is cooled to between 0° C. and −20° C. and the diacid chloride is added either as a solid or in a solution of one of the aforementioned solvents. The mixture is then stirred for a period of time until polymerization is substantially complete and a high viscosity is attained. This highly viscous solution may be spun per se or the polymer may be isolated by pouring the mixture into a non-solvent (coagulation) and then washing and drying the polymer and then preparing a spinning solution.

The interfacial polymerization reaction is conducted by mixing water, an emulsifier and the diamine or its dihydrochloride. A proton acceptor is then added and the mixture is stirred rapidly. During this rapid stirring a solution of a diacid halide in an inert organic solvent is added. The mixture is stirred until polymerization is complete. The polymer is then isolated by filtration, and is washed and dried. The diacid halide solvent may be a cyclic non-aromatic oxygenated organic solvent such as cyclic tetramethylene sulfone 2,4-dimethyl cyclic tetramethylene sulfone, tetrahydrofuran, propylene oxide and cyclohexanone. Further suitable solvents for the diacid halide include chlorinated hydrocarbons such as methylene chloride, chloroform and chlorobenzene, also benzene, acetone, nitrobenzene, benzonitrile, acetophenone, acetonitrile, toluene and mixtures of the above solvents such as tetrahydrofuran and benzonitrile, tetrahydrofuran and acetophenone or benzene and acetone and the like.

Suitable emulsifying agents for interfacial polymerization include anionic and nonionic compounds such as sodium lauryl sulfate, nonylphenoxy (ethyleneoxy) ethane, the sodium or potassium salt of any suitable condensed sulfonic acid and the like.

A proton acceptor as the term is employed herein indicates a compound which acts as an acid scavenger to neutralize HCl as formed during the reaction and keeps the reaction going until completion. Suitable proton acceptors include sodium carbonate, sodium hydroxide, potassium hydroxide, tertiary amines such as triethyl amine, trimethyl amine, tripropyl amine, ethyldimethyl amine, tributyl amine and similar compounds which react as desired The amounts of the various reactants which may be employed will, of course, vary according to the type of polymer desired. However, in most instances substantially equimolar quantities or a slight excess of diacid halide to diamine may be used. For interfacial polymerization reactions sufficient proton acceptor to keep the acidic byproducts neutralized is added, the exact amount easily determined by one skilled in the art.

The aromatic diamines used to prepare the aromatic polyamides of this invention have the general formula

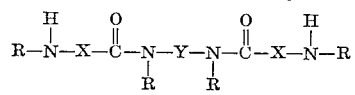

wherein R is selected from the group consisting of hydrogen, lower alkyl and phenyl, and X and Y, represent aromatic radicals selected from single, multiple and fused ring aromatic radicals. For example X and Y may be phenylene, biphenylene or naphthalene. These aromatic diamines are disclosed together with a method for their preparation in copending application S.N. 223,933 to Preston, et al. Among such diamines there may be mentioned N,N'-m-phenylenebis(p-aminobenzamide),
N,N'-m-phenylenebis(p-aminobenzamide),
N,N'-p-phenylenebis(m-aminobenzamide),
N,N'-p-phenylenebis(p-aminobenzamide),
N,N'-(2,6-naphthalene)bis(p-aminobenzamide),
N,N'-(2,7-naphthalene)bis(m-aminobenzamide),
N,N'-(1,5-naphthalene)bis(p-aminobenzamide),
N,N'-(1,5-naphthalene)bis(m-aminobenzamide),
N,N'-m-phenylenebis(7-amino-2-naphthamide),
   and the like.

A typical preparation of one of these diamines, N,N'-m-phenylenebis(m-aminobenzamide), is set forth in Example V.

Suitable diacid halides which are being used to prepare the polymers of this invention may be represented by the general formula

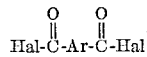

wherein Hal represents a halogen substituent such as chloro, bromo or iodo and Ar represents an aromatic nucleus such as phenylene, naphthalene or biphenyl. The aromatic nucleus may have groups substituted at desirable positions on the ring or rings, for example, alkyl, aryl, alkoxy or nitro substituents. More than one substituent group may be attached to the aromatic ring, but the substitution must be symmetrical. The total number of carbon atoms in each of the substituents should not exceed eight. As examples of such diacid halides there may be mentioned isophthaloyl chloride, 2-methyl-5-ethyl isophthaloyl chloride, terephthaloyl chloride, tetramethyl terephthaloyl chloride, 2,6-naphthalene dicarbonyl chloride, 2,7-naphthalene dicarbonyl chloride, 3,3'-biphenyldicarbonyl chloride, 4,4'-biphenyldicarbonyl chloride and the like.

The polymers of this invention have many highly desirable characteristics. They have an inherent viscosity of at least 0.6. Their high temperature resistance and low dielectric constant renders them useful in many applications such as electrical insulation, industrial filters, conveyor belts, tire cords, re-entry parachutes and so forth. They may be prepared interfacially or in solution in quantitative yields. In the latter or solution polymerization they may be spun directly to fibers from the polymerization solution without filtering, washing or drying of the polymer prior to the preparation of the spinning solution. The polymerization process is rendered less complicated due to the fact that the diamine component is very stable and does not oxidize to colored byproducts which limit molecular weight. The stability of the diamine permits the use of solution or interfacial polymerization techniques which would normally lead to discolored low molecular weight polymer. The diamines are for the most part economically attractive in comparison to diamines used in other polyamide reactions. The polymerization process requires less diacid chloride for reaction to high molecular weight polymer than for the processes known to the art and correspondingly less corrosive byproducts are formed. Less weight is lost for the starting materials to yield a given weight of polymer since less diacid chloride is used. This also means that less acid acceptor may be employed. The wholly aromatic polyamides of this invention are more adaptable to specific end uses than those reported heretofore. For example, by varying the orientation of X, Y and Z, highly soluble polymers, polymers of intermediate solubility or insoluble polymers having very high thermal resistance may be prepared.

To further illustrate the present invention and the advantages thereof, the following specific examples are given, it being understood that these are merely intended to be illustrative. In the examples all parts and percents are by weight unless otherwise indicated. Inherent viscosity values are determined in dimethylacetamide containing 5 percent lithium chloride at 30° C. at a concentration of 0.5 gram of polymer per 100 ml. of solution.

Example I

A 10.38 gm. sample of N,N'-m-phenylenebis(m-aminobenzamide) was dissolved in 55 ml. of dry dimethylacetamide and the solution was cooled to −20° C. An equimolar amount, 7.59 gms. of naphthalene-2,6-dicarbonyl chloride was added all at once and the temperature of the bath surrounding the stirred suspension was maintained at −20° C. for 15 minutes. After removal of the cooling bath the stirring was continued for approximately 2 hours at which time the yellow color of the acid chloride had disappeared and a water-white dope of very high viscosity had been formed. This dope was diluted and the polymer was precipitated out and isolated. Inherent viscosity of the polymer was 2.24. Differential thermal analysis and thermogravimetric analysis indicated that the polymer was stable up to 495° C. The polymer could be redissolved in dimethylacetamide containing 5 percent lithium chloride to form a 20 percent solution. From this solution fibers with a tenacity of 5 grams per denier were spun using a conventional dry spinning method.

*Example II*

To a conical flask was added 8.502 gms. of N,N′-m-phenylenebis(m-aminobenzamide) dissolved in 70 ml. dry dimethylacetamide and the solution was cooled to −20° C. An equimolar amount, 6.855 gms., of 4,4′-bibenzoylchloride was added all at once and the suspension was stirred and maintained at −20° C. for 15 minutes. At this time the cooling bath was removed and stirring was continued for 2 hours, during which time the viscosity of the solution increased. The dope was diluted with more dimethylacetamide and poured slowly into water containing a small amount of dimethylacetamide in a fast stirring Blendor. The polymer was precipitated and washed twice with water at 90° C., filtered, then washed with a 1 to 1 mixture of acetone and methanol and dried. The yield was 95 percent. Inherent viscosity measured dimethylacetamide containing 5 percent of lithium chloride as in previous examples was 0.86. Differential thermal analysis indicated a melting and decomposition point of 432° C.

*Example III*

A 5.19 gram portion of N,N′-m-phenylenebis(p-aminobenzamide) was dissolved in 30 ml. of dry dimethylacetamide containing 5 percent lithium chloride. The solution was cooled to −20° C. and 3.80 grams of naphthalene-2, 6-dicarbonyl chloride was added all at once. The cooling bath was removed after 15 minutes. After a further 45 minutes an additional 25 ml. of dimethylacetamide containing 5 percent lithium chloride was added. One hour later a clear viscous dope had been formed. The polymer was recovered, washed and dried. A differential thermal analysis of the polymer indicated no melting point or decomposition up to 500° C. Inherent viscosity was 1.38.

*Example IV*

A 3.96 gram portion of 2, 7-naphthalenebis(m-aminobenzamide) was dissolved in 75 ml. of dimethylacetamide. The solution was cooled to −20° C. and 2.53 grams of naphthalene-2, 6-dicarbonyl chloride was added all at once. After about one hour the reaction was complete and the resulting polymer was precipitated, washed and dried. The inherent viscosity of the polymer was 1.15. A differential thermal analysis in nitrogen showed a decomposition point of 455° C.

*Example V*

This example discloses the preparation of one of the diamines which are useful in preparing the polymers of the invention.

A solution of 38 gms. of m-nitrobenzoyl chloride in 40 ml. of dry chloroform was prepared and poured all at once into a Blendor jar containing 10.8 gms. of m-phenylenediamine, 0.1 gm. of sodium n-lauryl sulfonate as an emulsifier and 13 gms. of potassium hydroxide dissolved in 200 ml. of water. The reaction mixture was agitated rapidly, filtered and re-washed with warm water and filtered again. The resulting dried product, the intermediate in the preparation of the diamine, which may be called N,N′-m-phenylenebis(m-nitrobenzamide) was obtained in 85 percent yield and had a melting point of approximately 270° C. A 5 gm. portion of this intermediate was placed in a 250 ml. flask and refluxed with 50 ml. of absolute ethanol. The mixture was then cooled and a solution prepared by dissolving 25 gms. of stannous chloride hydrate in 30 ml. of concentrated hydrochloric acid with 50 ml. of absolute ethanol was added. A clear solution was obtained upon refluxing about 30 minutes. When the solution cooled, the diamine hydrochloride crystallized and was filtered, washed with ethanol and filtered again. The diamine was isolated by contacting the hydrochloride with sodium carbonate solution. The product, N,N′-m-phenylenebis(m-aminobenzamide) was obtained in approximately 70 percent yield and had a melting point of 212° C.

As many variations of this invention may be made without departing from the spirit and scope thereof, it is to be understood that the invention is not limited to the specific embodiments thereof except as defined in appended claims.

We claim:

1. A wholly aromatic thermally resistant fiber-forming polycarbonamide consisting predominantly of recurring structural units having the general formula:

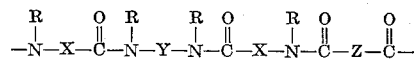

wherein X, Y and Z are divalent aromatic hydrocarbon radicals containing from 6 to 15 carbon atoms selected from the group consisting of single, multiple and fused ring radicals, at least one of which must have a multi-ring composition, and wherein R is selected from the group consisting of hydrogen, alkyl radicals containing from 1 to 3 carbon atoms and phenyl.

2. A wholly aromatic thermally resistant fiber-forming polyamide comprised predominantly of regularly recurring structural units having the general formula:

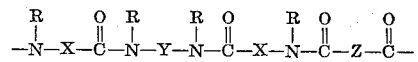

wherein X, Y and Z are divalent aromatic radicals selected from the group consisting of single, multiple and fused ring radicals, at least one of which must have a multi-ring composition, wherein said single ring radicals are oriented other than ortho, wherein X may and Y and Z must exhibit at least one plane of symmetry, and wherein R is selected from the group consisting of hydrogen, alkyl radicals containing up to three carbon atoms and phenyl.

3. The polycarbonamide of claim 1 wherein X is m-phenylene, Y is m-phenylene and Z is 4,4′-biphenylene.

4. The polycarbonamide of claim 1 wherein X is m-phenylene, Y is m-phenylene and Z is 2,6-naphthylene.

5. The polycarbonamide of claim 1 wherein X is m-phenylene, Y is 2,7-naphthylene and Z is 2,6-naphthylene.

6. A process for the preparation of wholly aromatic polyamides comprised predominantly of regularly recurring structural units having the general formula

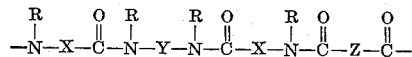

wherein X, Y and Z are divalent aromatic radicals selected from the group consisting of single, multiple and fused ring radicals, at least one of which must have a multi-ring composition, and wherein R is selected from the group consisting of hydrogen, alkyl radicals containing from 1 to 3 carbon atoms and phenyl, comprising reacting an aromatic diamine of the general formula

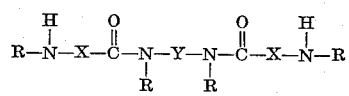

wherein R is selected from the group consisting of hydrogen, lower alkyl and phenyl, and X and Y represent aromatic radicals selected from the group consisting of single, multiple and fused ring aromatic radicals, with an aromatic diacid halide of the general formula

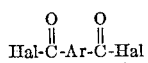

wherein Hal represents a halo radical and Ar represents a divalent aromatic hydrocarbon radical containing from 6 to 15 carbon atoms in the presence of a proton acceptor and an organic solvent to produce a polyamide having an inherent viscosity of at least 0.6 as measured in dimethylacetamide containing 5 percent lithium chloride at 30° C, at a concentration of 0.5 gram of polymer per 100 ml. of solution.

7. The process of claim 6 wherein the organic solvent is dimethylacetamide.

8. The process of claim 6 wherein the organic solvent is a mixture of 95 percent dimethylacetamide and 5 percent lithium chloride.

9. The process of claim 6 wherein the organic solvent is a mixture of tetrahydrofuran and benzonitrile.

References Cited by the Examiner

UNITED STATES PATENTS

| | | | |
|---|---|---|---|
| 2,688,011 | 8/1954 | Wheatley et al. | 260—78 |
| 2,917,490 | 12/1959 | Caldwell et al. | 260—78 |
| 3,049,518 | 8/1962 | Stephens | 260—78 |
| 3,094,511 | 6/1963 | Hill et al. | 260—78 |

WILLIAM H. SHORT, *Primary Examiner.*